United States Patent [19]

Freiberg

[11] 3,869,444

[45] Mar. 4, 1975

[54] ESTERS OF ERYTHROMYCIN OXIME
[75] Inventor: Leslie Alan Freiberg, Waukegan, Ill.
[73] Assignee: Abbott Laboratories, North Chicago, Ill.
[22] Filed: Oct. 10, 1972
[21] Appl. No.: 296,431

[52] U.S. Cl. ............................. 260/210 E, 424/180
[51] Int. Cl. ........................................... C07c 47/18
[58] Field of Search ................................ 260/210 E

[56]   References Cited
       UNITED STATES PATENTS
3,574,185   4/1971   Tamburasw et al............. 260/210 E Primary Examiner—Johnnie R. Brown
Assistant Examiner—Cary B. Owens
Attorney, Agent, or Firm—Robert L. Niblack; Vincent A. Mallare; James L. Bailey

[57]               ABSTRACT

Covers stable oxime esters of erythromycin oximes, which are active antibiotic agents.

14 Claims, No Drawings

ESTERS OF ERYTHROMYCIN OXIME

DISCLOSURE OF THE INVENTION

This invention relates to oxime esters of erythromycin oxime. More particularly, it relates to oxime esters of erythromycin A and B oxime that are stable to solvolysis which have the formula

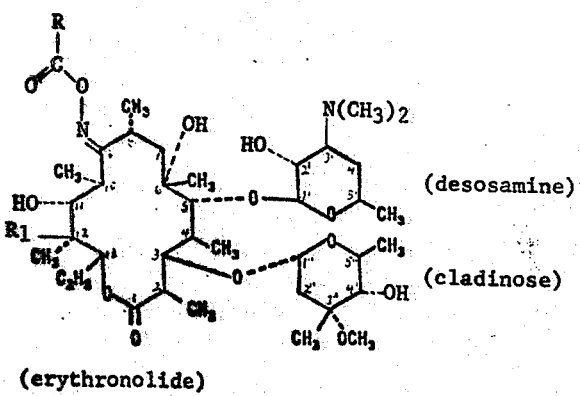

where $R_1$ is hydrogen or hydroxy, and R is a bulky alkyl group or a substituted aryl group, said substituted aryl group having the structural formula

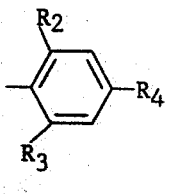

where $R_2$ and $R_3$ are loweralkyl and $R_4$ is selected from the group consisting of carboxamide, alkyl, carboxyalkyl, carboxylic acid, aminoalkyl, substituted aminoalkyl, carboxyaryl, carboxyaminoalkyl, and salts of any of the foregoing.

Oxime esters of erythromycin oxime are known; however, such esters are of a simple type and hydrolyze extensively in an aqueous medium. Therefore, it is the primary object of this invention to provide stable erythromycin oxime esters, carrying in the ester portion functional groups which modify and improve the therapeutic effect of the parent antibiotic. It has now been discovered that the erythromycin derivatives of this invention are especially stable to solvolysis, and furthermore, that such stability increases as the R group defined above becomes increasingly sterically hindered.

The compounds of the invention are prepared by the reaction of an acyl halide with erythromycin oxime. The reaction may be carried out in an inert solvent, such being defined as one which does not react substantially with reactant or product.

In general, the compounds of this invention are prepared by reacting an acyl halide of the formula RCOX where R is as hereinbefore defined, and where X is halide, preferably chloride, with erythromycin oxime. This latter compound is disclosed in U.S. Pat. No. 3,478,014. The reaction is best carried out by mixing the reactants at a temperature ranging from about 20° to 30° C. for a period of about 2 to 12 hours, at which time the reaction is considered substantially complete. The reaction is best carried out in an inert solvent as noted above such as dichloromethane and with a proton acceptor such as triethylamine.

The following examples further illustrate compounds prepared according to this method. The numbers in parentheses following the chemical name identify the compounds by such specific number, which may be alluded to in succeeding examples merely to identify said compounds by number.

EXAMPLE I 9-(O)-Trimethylacetylerythromycin B Oxime (1)

To a stirred solution of 2.00 g. (2.73 mmol.) of erythromycin B oxime in 50 ml. of dry acetone was added 1.00 g. (11.9 mmol.) of $NaHCO_3$ followed by 0.365 g. (3.02 mmol.) of trimethylacetyl chloride. The mixture was stirred for 6 hours at 25° C. and then was poured into 350 ml. of water containing 30 ml. of concentrated $NH_4OH$. The product was extracted with four 30 ml. portions of $CHCl_3$. The combined $CHCl_3$ layer was dried over anhyd. $Na_2SO_4$ and evaporated to leave 2.05 g. of crude product. The product was crystallized from a mixture of 20 ml. of acetone and 5 ml. of water to give 1.24 g. of ester 1: mp 133–135°.

Anal. calcd. for $C_{42}H_{76}N_2O_{13}$ (817.079):
C, 61.74; H, 9.38; N, 3.43; O, 25.64.
Found: C, 61.83; H, 9.54; N, 3.39; O, 25.27.

The reaction scheme for the above is as follows:

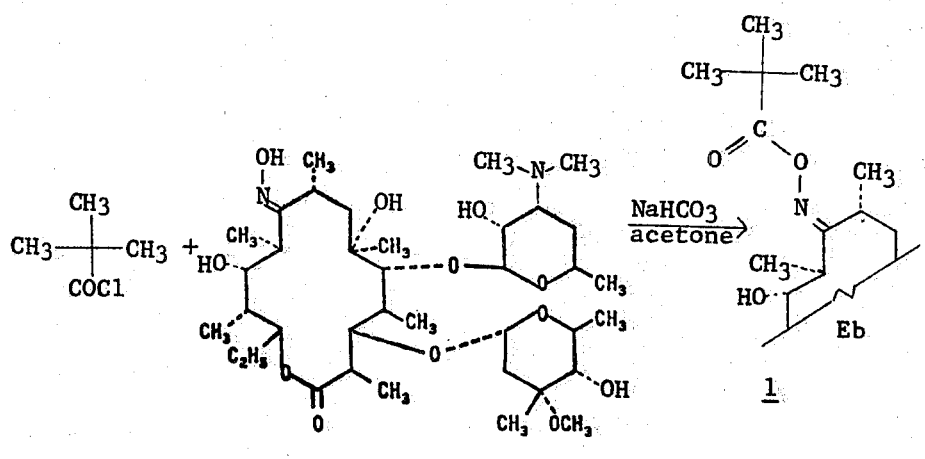

EXAMPLE II 9-(O)-(2,4,6-Trimethyl)benzoylerythromycin A Oxime (2)

To a stirred solution of 7.00 g. (9.35 mmol.) of erythromycin A oxime and 2.84 g. (28.0 mmol.) of triethylamine in 150 ml. of $CH_2Cl_2$ at 25° C. was added 1.83 (10.2 mmol.) of 2,4,6-trimethylbenzoyl chloride. The mixture was stirred briefly and then allowed to stand at 25° C. for 4 hours.

The mixture was transferred to a separatory funnel and washed with 80 ml. of water containing 7 ml. of concentrated $NH_4OH$. The $CH_2Cl_2$ layer was dried over anhyd. $Na_2SO_4$ and concentrated. The residue was crystallized from a mixture of 70 ml. of chloroform and 70 ml. of hexane to give 4.00 g. of the ester 2: mp. 132°–135°.

Anal. calcd. for $C_{47}H_{78}N_2O_{14}$ (895.151):
C, 63.06; H, 8.78; N, 3.13; O, 25.02.
Found: C, 62.89; H, 8.91; N, 3.10; O, 24.96.

EXAMPLE III 9-(O)-(2,4,6-Trimethyl)benzoylerythromycin B Oxime (3)

In a manner similar to Example II, 1.00 g. of erythromycin B oxime was reacted with 2,4,6-trimethylbenzoyl chloride. The crude product was crystallized from 10 ml. of acetone and 5.5 ml. of water to give 0.55 g. of 3: mp. 126°–129°.

Anal. calcd. for $C_{47}H_{78}N_2O_{13}$ (879.199):
C, 64.21; H, 8.95; N, 3.19; O, 23.66.
Found: C, 64.13; H, 8.96; N, 3.20; O, 23.67.

The reaction scheme for Examples II and III is as follows:

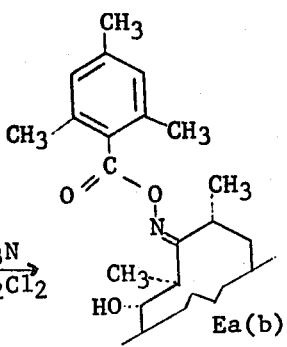

2, 3

EXAMPLE IV 9-(O)-(2,6-Dimethyl-4-carbomethoxy) benzoylerythromycin A Oxime (4)

In a manner similar to Example II 8.00 g. of erythromycin A oxime was reacted with (2,6-dimethyl-4-carbomethoxy)benzoyl chloride. The crude produce was crystallized from a mixture of 40 ml. of acetone and 32 ml. of water to give 4.10 g. of 4: mp. 137°–141°.

Anal. calcd. for $C_{48}H_{78}N_2O_{16}$ (939.160):
C, 61.39; H, 8.37; N, 2.98; O, 27.26.
Found: C, 61.25; H, 8.54; N, 2.95; O, 27.10.

EXAMPLE V 9-(O)-(2,6-Dimethyl-4-carbomethoxy)benzoylerythromycin B Oxime (5)

In a manner similar to Example II 2.00 g. of erythromycin B oxime was reacted with (2,6-dimethyl-4-carbomethoxy)benzoyl chloride. The crude product was crystallized from a mixture of 20 ml. of ethanol and 18 ml. of water to give 1.27 g. of 5: mp. 132°–136°.

Anal. calcd. for $C_{48}H_{78}N_2O_{15}$ (923.161):
C, 62.45; H, 8.52; N, 3.03; O, 26.00.
Found: C, 62.31; H, 8.60; N, 2.91; O, 25.76.

The reaction scheme for Examples IV and V is as follows:

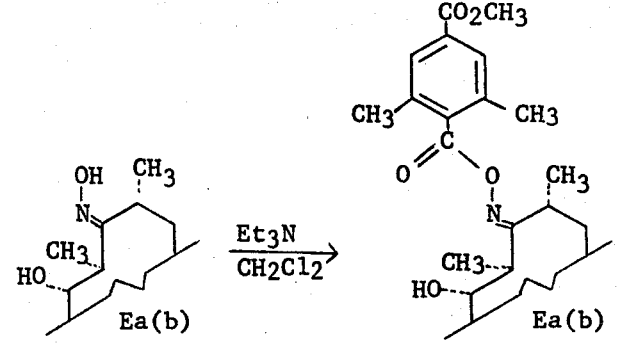

4, 5

EXAMPLE VI (2,6-Dimethyl-4-benzyloxycarbonyl)benzoyl Chloride (6)

A $CH_2Cl_2$ solution of the acid chloride 6 was prepared in the following manner: To 100 ml. of $CH_2Cl_2$ was added 0.67 ml. of (6.7 mmol.) of benzyl alcohol and 3.04 ml. (22.2 mmol.) of triethylamine. The mixture was stirred and cooled to 0° C. in an ice-bath. Then, 1.09 ml. (6.10 mmol.) of 2,6-dimethylterephthaloyl chloride was added and after minutes the ice-bath was removed. The mixture was allowed to stand at 25° C. for 2 hours. A sample removed at that time for infrared analysis showed bands at 1795 cm.$^{-1}$ (acid chloride) and at 1729 cm.$^{-1}$ (ester). Such solutions were stable for several hours, but were normally used immediately.

EXAMPLE VII 9-(0)-(2,6-Dimethyl-4-benzyloxycarbonyl) benzoylerythromycin B Oxime (7)

To the CH$_2$Cl$_2$ solution of 6 (Example VI) was added 4.00 g. (5.55 mmol.) of erythromycin B oxime. The mixture was stirred briefly to dissolve the oxime and then was allowed to stand at 25° C. for 4 hours. After transferring to a separatory funnel, the mixture was washed with 50 ml. of water containing 3 ml. of concentrated NH$_4$OH. The solvent was dried over Na$_2$SO$_4$ and evaporated to give 5.44 g. of crude 7.

Purification of the crude product was accomplished by chromatography. A column of 100 g. of Florisil was prepared in benzene and conditioned by eluting with 1.0 liter of benzene: 0.3 percent triethylamine. The sample was placed on the column in 15 ml. of that solvent and the column was eluted according to the following schedule, 125 ml. fractions being collected: frac. 1–4, φH/0.3% Et$_3$N; frac. 4–8, φH/1% MeOH/0.3%Et$_3$N; frac. 9–12, φH/2%/MeOH/0.3%Et$_3$N; frac. 13–16, φH/4%MeOH/0.3%Et$_3$N. Fractions 3–14 were shown by tlc. to be pure and were combined to give 4.44 g. of a glass. A 2.56 g. sample was crystallized from 15 ml. of acetone and 6 ml. of water to give 1.96 g. of 7: mp. 118–122°.

---

Anal. calcd. for C$_{54}$H$_{82}$N$_2$O$_{15}$ (999.259):
  C, 64.91; H, 8.27; N, 2.80; O, 24.02.
Found: C, 65.22; H, 8.44; N, 2.84; O, 23.70.

---

The reaction scheme for Examples VI and VII is as follows:

EXAMPLE VIII

[2,6-Dimethyl-4-(N-n-butylcarbamyl)]benzoyl Chloride (8)

A CH$_2$Cl$_2$ solution of the acid chloride 8 was prepared in the following manner: To 150 ml. of CH$_2$Cl$_2$ was added 0.835 ml. (8.18 mmol.) of n-butylamine and 4.58 ml. (32.8 mmol.) of triethylamine. The mixture was stirred and cooled to 0° C. in an ice-bath. Then, 1.48 ml. (8.18 mmol.) of 2,6-dimethylterephthaloyl chloride was added and after 20 minutes a sample was removed for infrared analysis which showed bands at 1795 cm.$^{-1}$ (acid chloride) and at 1668 cm.$^{-1}$ (amide). This solution was used directly without purification.

EXAMPLE IX 9-(0)-[2,6-Dimethyl-4-(N-N-butylcarbamyl)]benzoylerythromycin B Oxime (9)

To the CH$_2$Cl$_2$ solution of 8 (Example VIII) at 0° C. was added 6.00 g. (8.18 mmol.) of erythromycin B oxime. The mixture was stirred briefly to dissolve the oxime and then was allowed to stand at 25° C. for 4 hours. The solution was then washed with 80 ml. of water containing 5 ml. of concentrated NH$_4$OH. The solvent was dried over anhyd. Na$_2$SO$_4$ and evaporated to give 7.46 g. of crude product.

Purification of the crude product was accomplished by chromatography. A column of 140 g. of silica gel was prepared in CH$_2$Cl$_2$ and made basic with 1.5 liter of CH$_2$Cl$_2$: 1% Et$_3$N. The sample of crude 9 (7.46 g.) was placed on the column in 20 ml. of CH$_2$Cl$_2$:1%Et$_3$N and elution was begun with that solvent. Fractions of 125 ml. were collected and after each fraction the concentration of MeOH in the eluent was increased by 0.025 percent. A total of 16 fractions were collected. Fractions 3–9 were shown by tlc. to be pure and were combined to give 3.90 g. of a glass consisting of 9. The sampel could not be crystallized. An infrared showed bands at 1750 cm.$^{-1}$ (oxime ester), 1730 cm.$^{-1}$ (lactone), and 1660 cm.$^{-1}$ (amide).

---

Anal. calcd. for C$_{51}$H$_{85}$N$_3$O$_{14}$ (964.257):
  C, 63.53; H, 8.88; N, 4.36; O, 23.23.
Found: C, 63.62; H, 9.16; N, 4.48; O, 23.45.

---

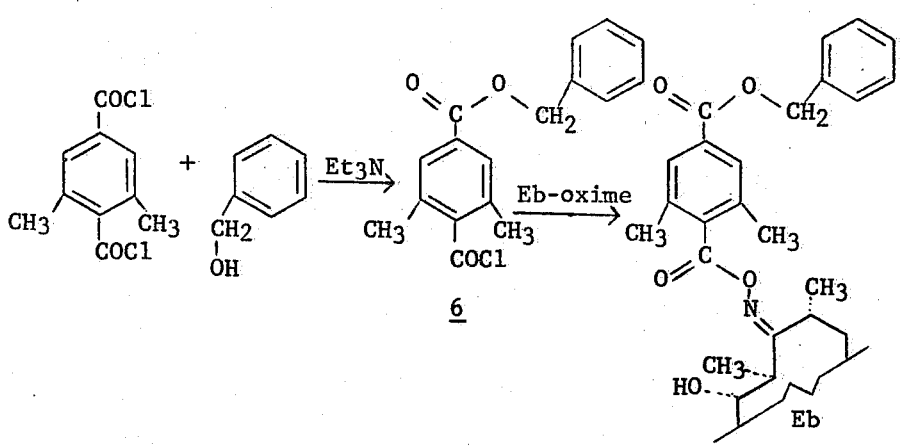

The reaction scheme for Examples VIII and IX is as follows:

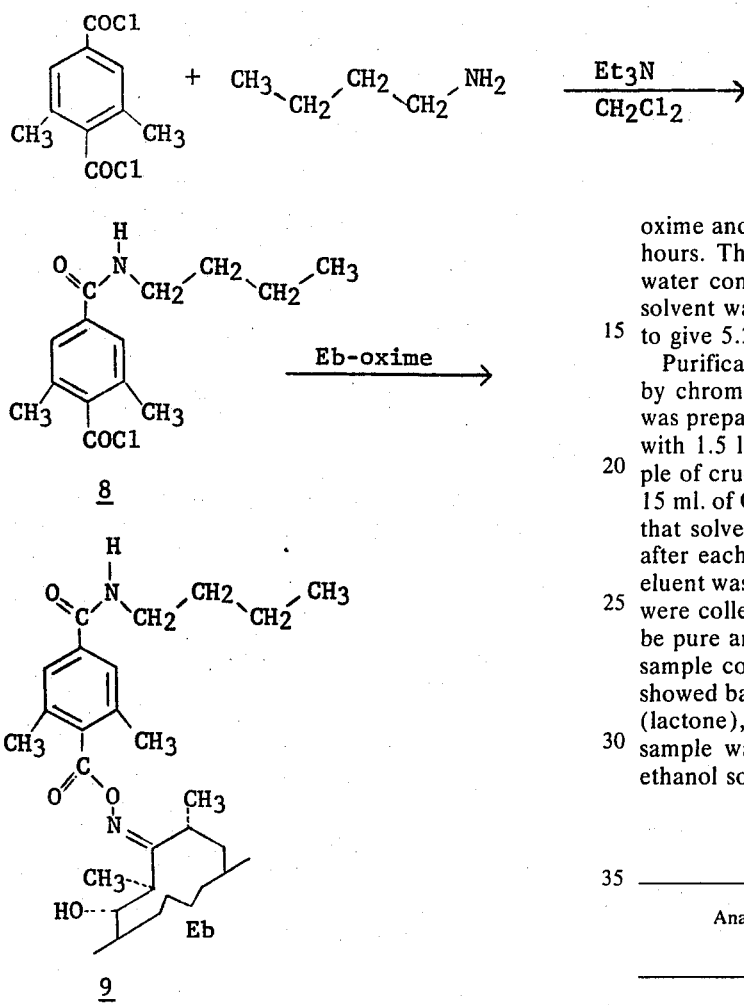

EXAMPLE X

[2,6-Dimethyl-4-(N-morpholinylcarbonyl)]benzoyl Chloride (10)

A $CH_2Cl_2$ solution of the acid chloride 10 was prepared in the following manner: To 100 ml. of $CH_2Cl_2$ was added 0.471 ml. (5.55 mmol.) of morpholine and 3.05 ml. (22.2 mmol.) of triethylamine. The mixture was stirred and cooled to 0° C. in an ice-bath. Then, 1.00 ml. (5.55 mmol.) of 2,6-dimethylterephthaloyl chloride was added and after 30 minutes a sample was removed for infrared analysis which showed bands at 1795 cm.$^{-1}$ (acid chloride) and at 1638 cm.$^{-1}$ (amide). This solution was used directly without purification.

EXAMPLE XI 9-(O)-[2,6-Dimethyl-4-(N-morpholinylcarbonyl)]benzoylerythromycin B Oxime (11)

To the $CH_2Cl_2$ solution of 10 (Example X) at 0° C. was added 4.00 g. (5.55 mmol.) of erythromycin B oxime. The mixture was stirred briefly to dissolve the oxime and then was allowed to stand at 25° C. for four hours. The solution was then washed with 50 ml. of water containing 3 ml. of concentrated $NH_4OH$. The solvent was dried over anhyd. $Na_2SO_4$ and evaporated to give 5.24 g. of crude product.

Purification of the crude product was accomplished by chromatography. A column of 140 g. of silica gel was prepared in $CH_2Cl_2$ and was made basic by eluting with 1.5 liter of $CH_2Cl_2$:0.3% triethylamine. The sample of crude 11 (5.24 g.) was placed on the column in 15 ml. of $CH_2Cl_2$:0.3%$Et_3N$ and elution was begun with that solvent. Fractions of 125 ml. were collected and after each fraction the concentration of MeOH in the eluent was increased by 0.025%. A total of 48 fractions were collected. Fractions 16–28 were shown by tlc. to be pure and were combined to give 2.52 g. of 11. The sample could not be crystallized. An infrared analysis showed bands at 1750 cm.$^{-1}$ (oxime ester), 1730 cm.$^{-1}$ (lactone), and 1628 cm.$^{-1}$ (amide). For analysis the sample was concentrated twice by evaporation from ethanol solutions and then dried.

Anal. calcd. for $C_{51}H_{83}N_3O_{15}$ (978.240):
C, 62.62; H, 8.55; N, 4.30; O, 24.53.
Found: C, 62.70; H, 8.80; N, 4.44; O, 24.39.

The reaction scheme for Examples X and XI is as follows:

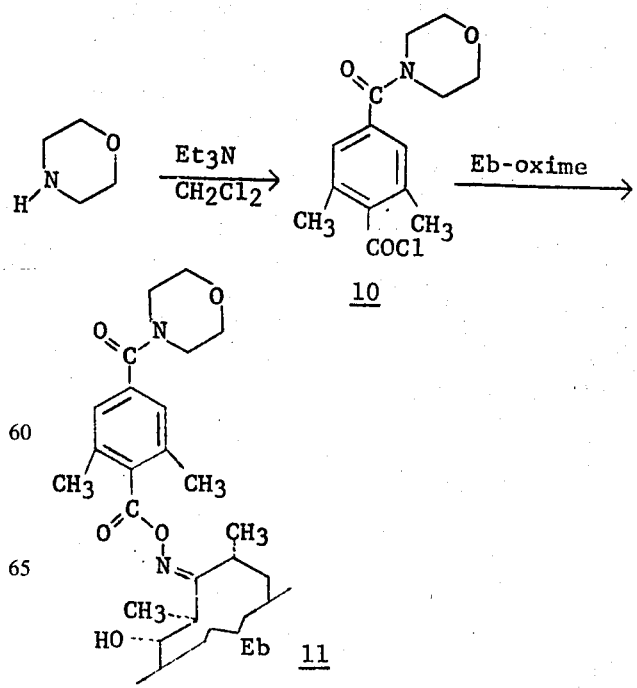

-13-

EXAMPLE XII

9-(O)-[2,6-Dimethyl-4-(N-methylpiperazinylcarbonyl)]benzoylerythromycin B Oxime (12)

A mixture of 50 ml. of dry $CH_2Cl_2$ and 1.52 ml. (10.9 mmol.) of triethylamine was protected from moisture with a Drierite drying tube and was cooled to 0° C. in an ice-bath. Then, 0.592 ml. (3.31 mmol.) of 2,6-dimethylterephthaloyl chloride was added, followed after a few minutes by 0.420 ml. (3.84 mmol.) of N-methylpiperazine added dropwise during three minutes. The ice-bath was removed and after 40 minutes 2.00 g. (2.73 mmol.) of erythromycin B oxime was added. After 24 hours, the mixture was diluted with 50 ml. $CH_2Cl_2$ and was washed with two 50 ml. portions of 1% $NaHCO_3$ solution. The $CH_2Cl_2$ was dried over $Na_2SO_4$ and was evaporated to give 2.87 g. of crude product.

Before purification, a by-product of this reaction, the bis (erythromycin B oxime) ester of 2,6-dimethyl-terephthaloyl chloride was degraded to a mixture of erythromycin B oxime and 5. This was accomplished by allowing the crude product to stand at 25° C. in 50 ml. of methanol, followed by 1 hour at reflux. The product was recovered from the methanol by evaporating, dissolving the residue in 150 ml. of $CH_2Cl_2$, washing with 50 ml. of 1 percent $NaHCO_3$, drying over $Na_2SO_4$, and finally evaporating the $CH_2Cl_2$ to leave 2.69 g. of crude product. A total of 8.0 g. of material was prepared in this way.

Thin layer chromatography showed the crude product contained six components. The desired product was separated using two column chromatography systems. The first system employed silica gel using $CH_2Cl_2$:0.9% $Et_3N$ initially, followed with that eluent containing increasing (2,4,8 and 12 percent) amounts of acetonitrile. The fractions containing the major amount of the desired product (5.61 g.) were eluted with $CH_2Cl_2$:12%$CH_3CN$:0.9%$Et_3N$. This material was rechromatographed in 2.8 g. portions on 200 g. of silica gel using EtOAc:15%MeOH: 1%$Et_3N$ as the eluent. Fractions (12 ml.) were cut every 30 minutes and were combined on the basis of tlc. results. Fractions of suitable purity were pooled and evaporated. The combined residue was dissolved in benzene, washed with 1 percent $NaHCO_3$, and dried over $Na_2SO_4$. Evaporation of the benzene gave 3.44 g. of 12 as a glass.

Anal. calcd. for $C_{52}H_{86}N_4O_{14}$ (991.283):
C, 63.01; H, 8.74; N, 5.65; O, 22.60.
Found: C, 62.71; H, 8.71; N, 5.49; O, 22.36.

The reaction scheme for Example XII is as follows:

EXAMPLE XIII

9-(O)-{2,6-Dimethyl-4-[N-(2-hydroxypropyl)-N-piperazinyl carbonyl]} benzoylerythromycin B Oxime (13)

A mixture of 100 ml. of $CH_2Cl_2$ and 1.09 ml. (6.00 mmol.) of 2,6-dimethylterephthaloyl chloride was cooled to 0° C. in an ice-bath. In a 50 ml. addition funnel was placed a mixture consisting of 3.04 ml. (21.8 mmol.) of triethylamine, 0.85 ml. (6.00 mmol.) of 1-(2-hydroxypropyl) piperazine, and 10 ml. of $CH_2Cl_2$. The amine mixture was added as rapidly as possible to the acid chloride solution (Ca. 5 seconds) while sitrring rapidly. After five minutes, 4.00 g. (5.45 mmol.) of erythromycin B oxime was added. After brief stirring the mixture was removed from the ice-bath and was allowed to stand 24 hours at 25° C. Then, the mixture was diluted with 50 ml. of $CH_2Cl_2$, washed with 70 ml. of 1 percent $NaHCO_3$ solution, dried, and evaporated. After oil pumping, the residue weighed 5.75 g.

Purification of 4.0 g. of this material was accomplished by chromatography of 2.0 g. samples on 200 g. columns of silica gel using EtOAc:15%MeOH:1%$Et_3N$ as the eluent. Fractions were combined on the basis of tlc. analysis. After evaporation of the eluent the residue was dissolved in 80 ml. of benzene, which was then washed with 40 ml. of 1 percent $NaHCO_3$ and 40 ml. of water. The benzene was dried over $Na_2SO_4$ and evaporated to give 3.04 g. of 13 as a glass after drying 24 hours in a vacuum oven at 65° C.

Anal. calcd. for $C_{54}H_{90}N_4O_{15}$ (1035.337):
C, 62.65; H, 8.76; N, 5.41; O, 23.18.
Found: C, 62.74; H, 8.87; N, 5.34; O, 23.15.

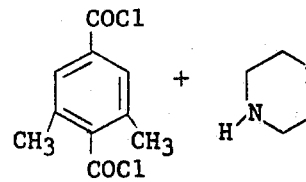 + 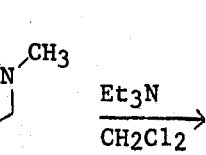 $\xrightarrow[CH_2Cl_2]{Et_3N}$ 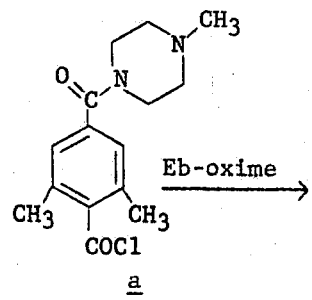 $\xrightarrow{Eb\text{-oxime}}$ 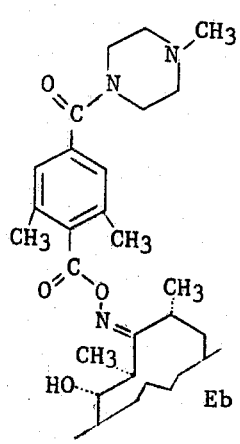

a

12

The reaction scheme for Example XIII is as follows:

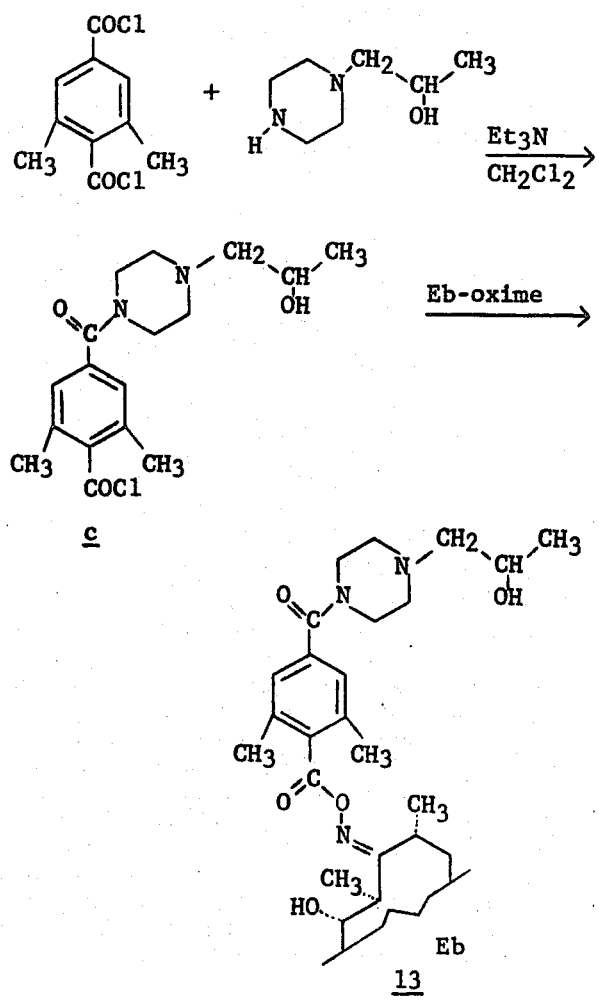

EXAMPLE XIV 9-(0)-[2,6-Dimethyl-4-(4-methyl-1-pentyloxycarbonyl)]benzoylerythromycin B Oxime (14)

A mixture of 100 ml. of CH₂Cl₂, 1.52 ml. of (21.8 mmol.) of triethylamine, and 0.90 ml. (7.07 mmol.) of 4-methyl-1-pentanol was stirred at 25° C. while 1.18 ml. (7.07 mmol.) of 2,6-dimethylterephthaloyl chloride was added during a few minutes. After 2 hours at 25° C. a sample was examined and showed peaks at 1792 cm.$^{-1}$ (acid chloride) and 1718 cm.$^{-1}$ (ester) in the infrared. To this solution of 2,6-dimethyl-4-[4-methyl-1-pentyloxycarbonyl] benzoyl chloride was added 4.00 g. (5.45 mmol.) of erythromycin B oxime. After stirring briefly the mixture was allowed to stand at 25° overnight. Then the mixture was washed with two 50 ml. portions of 1 percent NaHCO₃, was dried over Na₂SO₄. The solvent was evaporated to give 6.19 g. of crude product.

Two 2.0 g. samples of this product were chromatographed on 200 g. silica gel columns using benzene:50 percent ethylacetate:1%Et₃N as the eluent. Fractions of 8–10 ml. were cut every 8 minutes, and were pooled on the basis of tlc. results. After evaporation of the eluent, the residue was dissolved in benzene and wash washed with 1 percent NaHCO₃. The benzene was dried over Na₂SO₄ and was evaporated to give 2.34 g. of 14 as a glass. The sampel was dried in a vacuum oven at 65° C. for 24 hours.

Anal. calcd. for C₅₃H₈₈N₂O₁₅ (993.296):
C, 64.09; H, 8.93; N, 2.82; 0, 24.16.
Found: C, 64.31; H, 9.13; N, 2.76; 0, 23.76.

The reaction scheme for Example XIV is as follows:

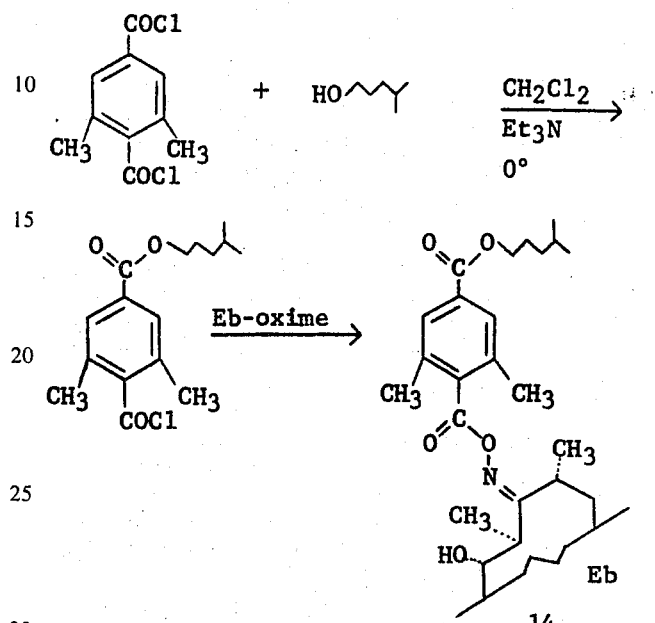

EXAMPLE XV 9-(0)-{2,6-Dimethyl-4-[3-(N,N-dimethylamino)propyloxy carbonyl]} benzoylerythromycin B Oxime (15)

A mixture of 50 ml. of CH₂Cl₂, 1.52 ml. (21.8 mmol.) of triethylamine, and 0.416 ml. (3.54 mmol.) of 3-dimethylamino-1-propanol was stirred at 25° C. while 0.592 ml. (3.26 mmol.) of 2,6-dimethylterephthaloyl chloride was added during 15 seconds. The mixture was stirred at 25° C. for 1 hour. A sample was removed which showed bands at 1792 cm.$^{-1}$ (acid chloride) and 1719 cm.$^{-1}$ (ester) in the infrared. To this solution of 2,6-dimethyl-4-[3-(N,N-dimethylamine)-propyloxycarbonyl]benzoyl chloride was added 2.00 g. (2.72 mmol.) of erythromycin B oxime. After 5 hours at 25° C. the mixture was diluted with 50 ml. of CH₂Cl₂ and was washed with 25 ml. of 1 percent NaHCO₃. The wash was separated and extracted with 30 ml. of CH₂Cl₂. The combined CH₂Cl₂ layers were dried over Na₃SO₄, and evaporated to leave 3.21 g. of crude product.

The sample was chromatographed in two portions on a 200 g. column of silica gel using EtOAc:15%MeOH:-1%Et₃N as the eluent. Fractions of 8–10 ml. were collected every 8 minutes and were pooled on the basis of tlc. results. The eluent was evaporated and the residue was dissolved in 100 ml. of benzene. The benzene was washed with 25 ml. of 1 percent NaHCO₃ followed by 10 ml. of water. After drying over Na₂SO₄, the benzene was evaporated to give 2.42 g. of 15 as a glass. The glass was dried in a vacuum oven at 73° C. for 3 days.

Anal. calcd. for C₅₂H₈₇N₃O₁₅ (994.283):
C, 62.82; H, 8.82; N, 4.23; 0, 24.14.
Found: C, 62.98; H, 9.05; N, 4.22; 0, 24.01.

The reaction scheme for Example XV is as follows:

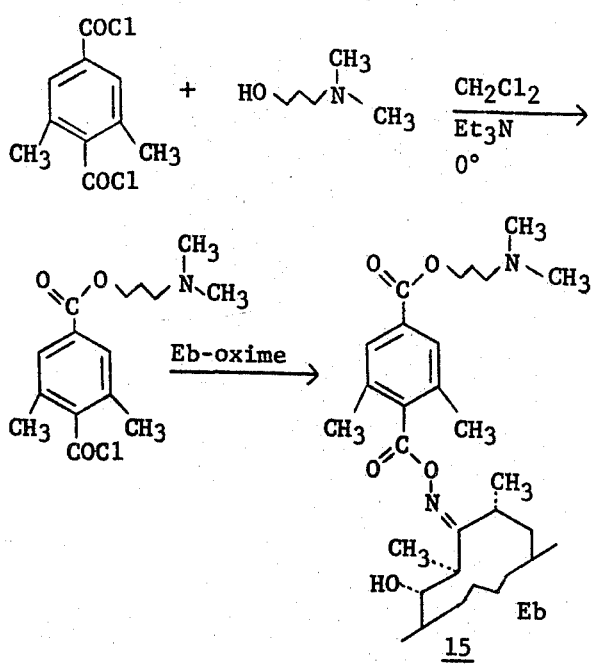

EXAMPLE XVI 9-(O)-{2,6-Dimethyl-4-[N-(4-methyl-1-pentyl)carbamyl]}benzoylerythromycin B Oxime (16)

Following the procedure of Examples VIII and IX, but replacing n-butylamine with 1-amino-4-methylpentane gave 16.

Anal. calcd. for $C_{53}H_{89}N_3O_{14}$ (992.312):
C, 64.15; H, 9.04; N, 4.23; O, 22.57.
Found: C, 64.00; H, 9.24; N, 4.17; O, 22.36.

The reaction scheme for Example XVI is as follows:

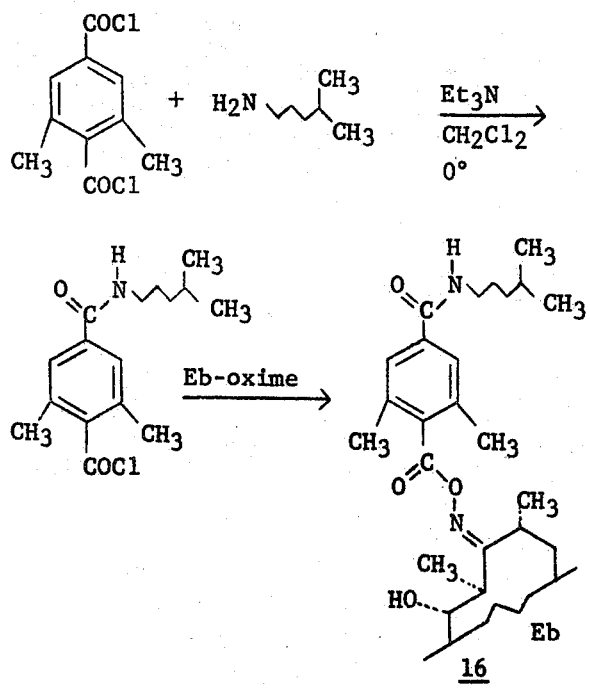

EXAMPLE XVII 9-(O)-{2,6-Dimethyl-4-[3-(N,N-dimethylamino)propyl carbamyl]}benzoylerythromycin B Oxime (17)

To a mixture of 125 ml. of $CH_2Cl_2$ and 3.82 ml. (27.3 mmol.) of triethylamine, cooled in an ice-bath, was added 1.36 ml. (7.50 mmol.) of 2,6-dimethylterephthaloyl chloride. Immediately, 0.93 ml. (7.50 mmol.) of 3-dimethylamino-1-propylamine was added. The ice-bath was removed and the mixture was stirred at 25° C. for 45 minutes. A sample showed bands at 1780 cm.$^{-1}$ (acid chloride) and 1655 cm.$^{-1}$ (amide) in the infrared. Then, to the solution of 2,6-dimethyl-4-[3-(N,N-dimethylamino)propylcarbamyl]benzoyl chloride was added 5.00 g. (6.82 mmol.) of erythromycin B oxime. The mixture was stirred at 25° C. for 5.5 hours. Then, washing with three 50 ml. portions of 1 percent $NaHCO_3$, drying over $Na_2SO_4$, and evaporating gave 7.04 g. of crude product.

The sample was chromatographed in two portions on a 200 g. silica gel column, using EtOAc:50%MeOH:-1%$Et_3N$ as the eluent. Fractions of 10–14 ml. were collected every 24 minutes, and were pooled on the basis of tlc. results. The eluent was evaporated to give 5.47 g. total of purified 17.

Anal. calcd. for $C_{52}H_{88}N_4O_{14}$ (993.299):
C, 62.88; H, 8.93; N, 5.64; O, 22.56.
Found: C, 63.15; H, 9.17; N, 5.56; O, 22.70.

The reaction scheme for Example XVII is as follows:

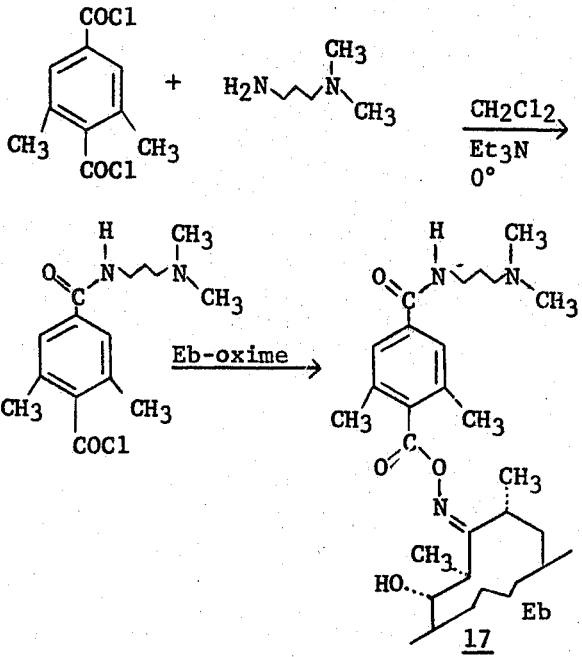

EXAMPLE XVIII 9-(O)-(2,6-Dimethyl-4-carboxy)benzoylerythromycin B Oxime (18)

A 1.00 g. of sample of 7 was dissolved in 135 ml. of prehydrogenated ethanol. The mixture was stirred in the presence of 0.5 g. of 5% pd.-$CaCO_3$ in an atmosphere of hydrogen. After 2 hours the theoretical volume of hydrogen was consumed. The mixture was filtered and the ethanol was evaporated to give 0.90 g. of 18 as a glass. The sample was dissolved in 18 ml. of warm $CH_2Cl_2$ and 10 ml. of amyl acetate was added. On standing crystals formed giving 0.73 g. of pure 18 mp. 157°–168° C.

Anal. calcd. for $C_{47}H_{76}N_2O_{15}$ (909.134):
C, 62.09; H, 8.43; N, 3.08; O, 26.40.
Found: C, 62.23; H, 8.67; N, 3.06; O, 26.77.

The reaction scheme for Example XVIII is as follows:

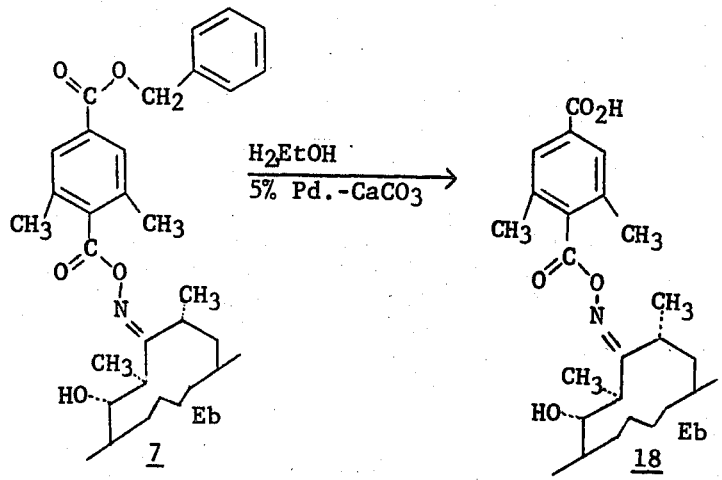

EXAMPLE XIX

Chlorination of Mesitoyl Chloride

A 19.66 g. (0.108 mol.) sample of mesitoyl chloride was placed in a three neck flask fitted with a condenser, gas inelt tube, and a magnetic stirring bar. The liquid was stirred and heated to 130°–140° C. in an oil-bath. The flask was irradiated with a 150 watt flood lamp while chlorine gas was bubbled into the liquid. After 45 minutes the weight increase was 3.96 g. (3.74 g. theory for monochlorination). Further treatment with chlorine was stopped and the liquid was distilled through a 50 cm. Podbielniak column at 12.5 mm. Hg., bp. 147°–149° C. to give 11.2 g. of product.

Anal. calcd. for $C_{10}H_{10}O_2Cl_2$ (217.097):
C, 55.33; H, 4.64; Cl., 32.66.
Found: C, 55.07; H, 4.68; Cl., 32.52.

Infrared analysis showed a band at 1795 cm.$^{-1}$ (acid chloride). Examination of the sample by nmr. showed this product to be approximately a 50/50 mixture of 2-chloromethyl-4,6-dimethylbenzoyl chloride and 4-chloromethyl-2,6-dimethyl-benzoyl chloride.

EXAMPLE XX

9-(0)-[2,6-Dimethyl-4-(N,N-dimethylaminomethyl)]benzoylerythromycin B Oxime (20)

To a mixture of 200 ml. of $CH_2Cl_2$, 8.00 g. (10.9 mmol.) of erythromycin B oxime, and 6.1 ml. (43.6 mmol.) of triethylamine, stirred at 25° C., was added 2.33 ml. (13.1 mmol.) of the mixture of 2 and 4-chloromethyl isomers of Example XIX. After standing for 5 hours at 25° C., the mixture was washed with two 70 ml. portions of 1 percent $NaHCO_3$, was dried over $Na_2SO_4$, and was evaporated to give 10 g. of crude isomeric oxime esters. This mixture was used without purification.

The sample of isomeric oxime esters was dissolved in a mixture of 500 ml. of methanol and 20 g. of dimethylamine. The solution was allowed to stand at 25° C. for 6 hours. Then, the methanol was concentrated to a volume of 50 ml. using a rotary evaporator and a water bath at 35° C. this residue was mixed with 250 ml. of benzene and was washed with one 100 ml. and three 50 ml. portions of 1 percent $NaHCO_3$. The combined washes were back extracted with 100 ml. of benzene. The combined benzene layers were dried over $Na_2SO_4$ and were evaporated to give 8.16 g. of a mixture of 20 and erythromycin B oxime. The sample was dissolved in 25 ml. of $CHCl_3$ and 70 ml. of hexane was added. On standing 3.72 g. of crystalline erythromycin B oxime was removed. The filtrate was evaporated to give 5.28 g. of a residue consisting of predominately 20. Further purification was achieved by column chromatography of 2.6 g. samples of 200 g. columns of silica gel, using EtOAc: 10%MeOH:1%Et$_3$N as the eluent. Fractions of 6-8 ml., cut every 8 minutes, were pooled on the basis of tlc. results. The eluent was evaporated and the residue was dissolved in 100 ml. of benzene. The benzene was washed with three 50 ml. portions of $NaHCO_3$, was dried over $Na_2SO_4$ and was evaporated to give 1.67 g. of 20 free of erythromycin B oxime. Final purification was accomplished by removal of a small amount of 2,4-dimethyl-6-dimethylaminomethyl-N,N-dimethylbenzamide by chromatography on a 84 × 1.5 cm. column of Sephadex LH-20, using methanol as the eluent. The eluent was evaporated from pooled fractions and the residue was dissolved in 80 ml. of benzene. The benzene was washed with 30 ml. of dilute aqueous NaOH solution, was dried over $Na_2SO_4$, and was evaporated to give 0.82 g. of pure 20.

Anal. calcd. for $C_{49}H_{83}N_3O_{13}$ (922.219):
C, 63.82; H, 9.07; N, 4.56; O, 22.55.
Found: C, 63.90; H, 9.31; N, 4.42; O, 22.66.

The reaction scheme for Examples XIX and XX is as follows:

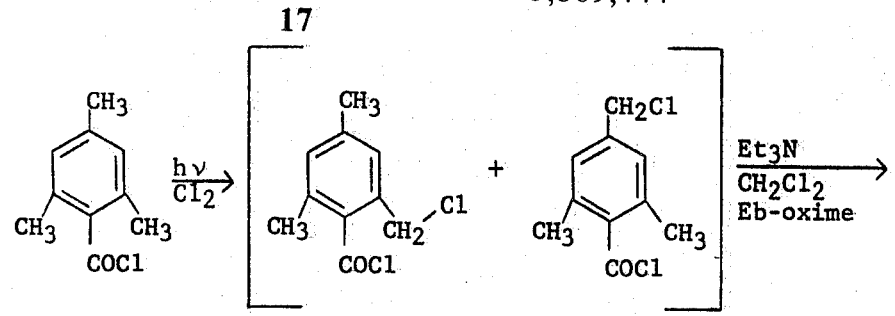

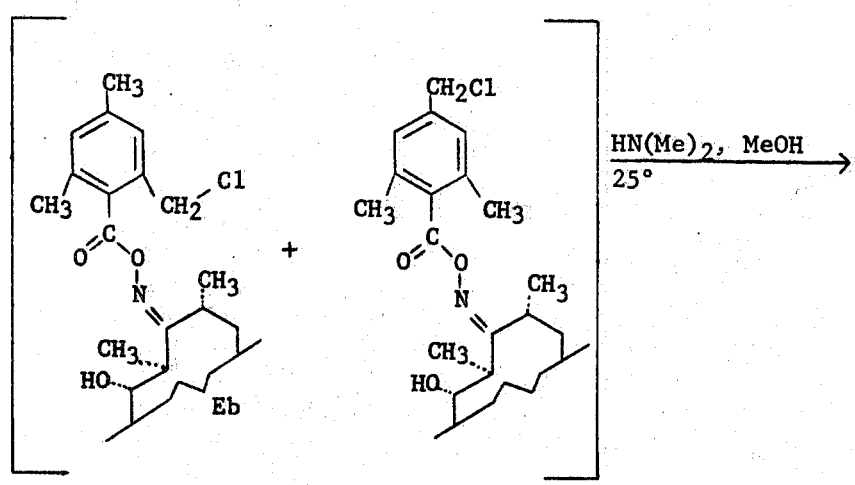

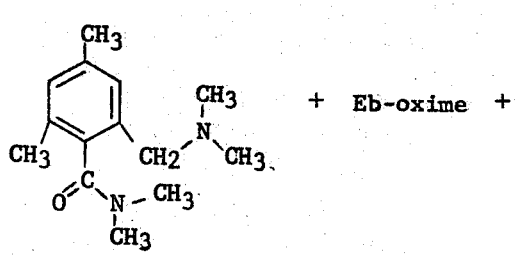

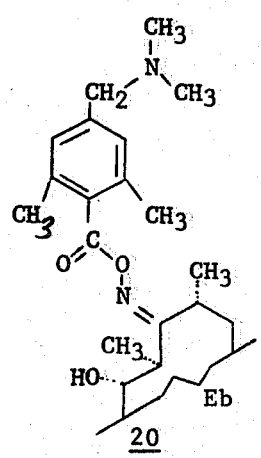

20

EXAMPLE XXI 9-(O)-(2,4,6-Trimethyl)benzoylerythromycin A Oxime Hydrochloride (21)

A 3.00 g. sample of 2 was dissolved in 50 ml. of methanol and 6.7 ml. of 0.5 N methanolic hydrochloric acid was added. The solvent was evaporated and the residue was dried for 2 hours in a vacuum oven at 65° C.

Anal. calcd. for $C_{47}H_{79}N_2O_{14}Cl$ (931.612):
Cl., 3.92.
Found: Cl., 3.38.

EXAMPLE XXII 9-(O)-(2,4,6-Trimethyl)benzoylerythromycin A Oxime Acetic Acid Salt (22)

A 3.00 g. sample of 2 was dissolved in a mixture of 40 ml. of benzene and 10 ml. of methanol. Then 0.195 ml. of acetic acid was added and the mixture was concentrated. The residue was dried with an oil pump. Examination of the sample by nmr. showed a three proton singlet at 2.01 ppm. consistent with the acetic acid salt.

EXAMPLE XXIII 9-(O)-{2,6-Dimethyl-4-(n-butyloxycarbonyl]}benzoylerythromycin B Oxime (23)

Following the procedure of Example XIV, but replacing 4-methyl-1-pentanol with n-butanol, gave 23.

Anal. calcd. for $C_{51}H_{84}N_2O_{15}$ (965.241):
C, 63.46; H, 8.77; N, 2.90; O, 24.86.
Found: C, 63.00; H, 8.83; N, 2.90; O, 24.63.

The compounds were tested for their activity against gram positive and gram negative bacteria in an agar dilution test. Results are reported in Tables I through IV and are given in MIC values (minimum inhibitory concentrations) expressed in micrograms ml. as to compounds from various Examples. Results in parentheses are those additional tests run which are log dilutions. The pH of the agar dilution was 7.4.

The resulting of in vivo testing are reported in Table

TABLE I

IN VITRO BIOLOGICAL TEST RESULTS

| Bacteria | Ery. A | Ery. B | Cpd. 1 | Cpd. 3 |
|---|---|---|---|---|
| Staph aureus 9144 | 0.39 | 0.39 | 1.56 | 0.78 |
| Staph aureus Smith | 0.39 | 0.39 | 1.56 | 0.78 |
| Staph aureus Smith ER | >100 | >100 | >100 | >100 |
| Staph aureus Quinones | >100 | >100 | >100 | 25 |
| Staph aureus Wise 155 | >100 | >100 | >100 | 50 |
| Strep faecalis 10541 | 0.1 | 0.05 | 0.39 | 0.2 |
| E. coli Juhl | 100 | 100 | >100(>1000) | >100(1000) |
| Klebsiella pneumoniae 10031 | 6.2 | 6.2 | >100 | 25 |
| Proteus vulgaris Abbott JJ | >100(1000) | >100(1000) | >100(>1000) | >100(1000) |
| Proteus mirabilis Finland No. 9 | >100(1000) | >100(1000) | >100(>1000) | >100(>1000) |
| Salmonella typhimurium ED No. 9 | 50 | 100 | >100(>1000) | 100 |
| Pseudomonas aeruginosa BMH No. 10 | 50 | 100 | >100(>1000) | 100 |
| Strep pyogenes Roper | >100 | >100 | >100 | 25 |
| Strep pyogenes Scott | >100 | >100 | >100 | 25 |
| Fungi | | | | |
| C. globosum | >100 | >100 | >100 | >100 |
| M. verrucaeia | >100 | >100 | >100 | >100 |
| A. versicolor | >100 | >100 | >100 | >100 |
| P. citrinum | >100 | >100 | >100 | >100 |
| F. oxysporum | >100 | >100 | >100 | >100 |
| Alternaria | >100 | >100 | >100 | >100 |
| Rhizopus nigricans | >100 | >100 | >100 | >100 |
| Additional Microorganisms | | | | |
| Myco. gallisepticum S6 | 0.02 | 0.02 | 0.02 | 0.02 |
| Myco. granularum 19168 | 0.05 | 0.02 | 0.05 | 0.05 |
| Myco. hyorhinis 17981 | 100 | 100 | >100 | 10 |
| Myco. pneumoniae FH | 0.02 | 0.02 | 0.005 | 0.01 |
| Pan. redivivus Static | >100 | >100 | >100 | >100 |
| Pan. redivivus Cidal | >100 | >100 | >100 | >100 |
| Trichomonas vaginalis C1M1 | >100 | >100 | >100 | 100 |
| Crithidia fasciculata | >100 | >100 | >100 | >100 |
| Hemophilus influenzae 9334 | 2.5 | 5.0 | >100 | 25 |

TABLE II

IN VITRO BIOLOGICAL TEST RESULTS

| Bacteria | Ery. A | Ery. B | Cpd. 5 | Cpd. 7 | Cpd. 9 | Cpd. 11 |
|---|---|---|---|---|---|---|
| Staph aureus 9144 | 0.39 | 0.39 | 0.78 | 100 | 1.56 | 1.56 |
| Staph aureus Smith | 0.39 | 0.39 | 0.39 | 100 | 3.1 | 1.56 |
| Staph aureus Smith ER | >100 | >100 | >100 | >100 | >100 | >100 |
| Staph aureus Quinones | >100 | >100 | 25 | >100 | 50 | 50 |
| Staph aureus Wise 155 | >100 | >100 | 50 | >100 | 100 | >100 |
| Strep faecalis 10541 | 0.1 | 0.1 | 0.2 | 25 | 0.39 | 1.56 |
| E. coli, Juhl | 100 | 100 | 100 | >100(>1000) | >100(>1000) | >100(1000) |
| Klebsiella pneumoniae 10031 | 6.2 | 3.1 | 25 | >100 | 100 | 50 |
| Proteus vulgaris Abbott JJ | >100(1000) | >100(1000) | >100(1000) | >100(>1000) | >100(>1000) | >100(>1000) |
| Proteus mirabilis Finland No. 9 | >100(1000) | >100(1000) | >100(1000) | >100(>1000) | >100(>1000) | >100(>1000) |
| Salmonella typhimurium ED No. 9 | 50 | 100 | 50 | >100(>1000) | >100(1000) | >100(1000) |
| Shigella sonnei 9290 | 25 | 25 | 50 | >100 | >100 | >100 |
| Pseudomonas aeruginosa BMH No. 10 | 50 | 100 | 100 | >100(>1000) | >100(>1000) | >100(1000) |
| Strep pyogenes Roper | >100 | >100 | 50 | 100 | 100 | >100 |
| Strep pyogenes Scott | >100 | >100 | 50 | 100 | 100 | >100 |
| C. globosum | >100 | >100 | >100 | | | |
| M. verrucaris | >100 | >100 | >100 | | | |
| A. versicolor | >100 | >100 | >100 | | | |
| P. citrinum | >100 | >100 | >100 | | | |
| F. oxysporum | >100 | >100 | >100 | | | |
| Alternaria | >100 | >100 | >100 | | | |
| R. nigricans | >100 | >100 | >100 | | | |
| Additional Microorganisms | | | | | | |
| Myco. gallisepticum S6 | 0.05 | 0.1 | 0.05 | 100 | 25 | 10 |
| Myco. granularum 19168 | 0.05 | 0.1 | 0.05 | 5.0 | 0.25 | 0.25 |
| Myco. hyorhinis 17981 | 100 | 100 | 5.00 | >100 | 50 | 10 |
| Myco. pneumoniae FH | 0.02 | 0.05 | 0.02 | 1.0 | 0.25 | 0.05 |

TABLE II - Continued

IN VITRO BIOLOGICAL TEST RESULTS

| Fungi | Ery. A | Ery. B | Cpd. 5 | Cpd. 7 | Cpd. 9 | Cpd. 11 |
|---|---|---|---|---|---|---|
| *Panagrellus redivivus* Static | >100 | >100 | >100 | >100 | >100 | >100 |
| *Panagrellus redivivus* Cidal | >100 | >100 | >100 | >100 | >100 | >100 |
| *Trichomonas vaginalis* C1M1 | >100 | >100 | >100 | >100 | >100 | >100 |
| *Crithidia fasciculata* | >100 | >100 | >100 | >100 | >100 | >100 |
| *Haemophilus influenzae* 9334 | 2.5 | 5.0 | 10.0 | >100 | 25 | 10 |

TABLE III

IN VITRO BIOLOGICAL TEST RESULTS

| Bacteria | Ery. A | Ery. B | Cpd. 2 | Cpd. 4 |
|---|---|---|---|---|
| *Staph aureus* 9144 | 0.2 | 0.39 | 0.78 | 0.39 |
| *Staph aureus* Smith | 0.2 | 0.39 | 0.39 | 0.39 |
| *Staph aureus* Smith ER | >100 | >100 | >100 | >100 |
| *Staph aureus* Quinones | >100 | >100 | >100 | >100 |
| *Staph aureus* Wise 155 | >100 | >100 | 25 | 25 |
| *Strep faecalis* 10541 | 0.05 | 0.05 | 0.39 | 0.1 |
| *E. coli* Juhl | 50 | 100 | >100(1000) | >100(1000) |
| *Klebsiella pneumoniae* 10031 | 6.2 | 3.1 | 50 | 25 |
| *Proteus vulgaris* Abbott JJ | >100(1000) | >100(1000) | >100(>1000) | >100(1000) |
| *Proteus mirabilis* Finland No. 9 | >100(1000) | >100(1000) | >100(>1000) | >100(1000) |
| *Salmonella typhimurium* ED No. 9 | 50 | 100 | >100(1000) | 50 |
| *Shigella sonnei* 9290 | 25 | 25 | 100 | 25 |
| *Pseudomonas aeruginosa* BMH No. 10 | 100 | 100 | 100 | 100 |
| *Strep pyogenes* Roper | >100 | >100 | 100 | 100 |
| *Strep pyogenes* Scott | >100 | >100 | 100 | 100 |
| Additional Microorganisms | | | | |
| *Myco. gallisepticum* S6 | 0.05 | 0.1 | 2.5 | 1.0 |
| *Myco. granularum* 19168 | 0.02 | 0.02 | 0.25 | 0.25 |
| *Myco. hyorhinis* 17981 | 25 | 100 | 2.5 | 1.0 |
| *Myco. pneumoniae* FH | 0.01 | 0.02 | 0.02 | 0.02 |
| *Pan. redivivus* Static | >100 | >100 | >100 | >100 |
| *Pan. redivivus* Cidal | >100 | >100 | >100 | >100 |
| *Trichomonas vaginalis* C1M1 >100 | >100 | >100 | >100 | |
| *Crithidia fasiculata* | >100 | >100 | >100 | >100 |
| *Haemophilus influenzae* 9334 | 2.5 | 5.0 | 25 | 25 |

TABLE IV

IN VITRO BIOLOGICAL TEST RESULTS

| Bacteria | Ery. A | Ery. B | Cpd. 12 | Cpd. 18 | Cpd. 14 | Cpd. 17 | Cpd. 20 | Cpd. 13 | Cpd. 15 |
|---|---|---|---|---|---|---|---|---|---|
| *Staph aureus* 9144 | 0.39 | 0.39 | 1.56 | 12.5 | 12.5 | 6.2 | 0.39 | 6.2 | 3.1 |
| *Staph aureus* Smith | 0.39 | 0.39 | 1.56 | 12.5 | 12.5 | 3.1 | 0.39 | 6.2 | 3.1 |
| *Staph aureus* Smith ER | >100 | >100 | >100 | >100 | 25 | >100 | >100 | >100 | >100 |
| *Staph aureus* Quinones | >100 | >100 | 100 | >100 | 12.5 | >100 | 25 | >100 | 50 |
| *Staph aureus* Wise 155 | >100 | >100 | >100 | >100 | 12.5 | >100 | 12.5 | >100 | 25 |
| *Strep faecalis* 10541 | 0.05 | 0.05 | 1.56 | 12.5 | 3.1 | 6.2 | 0.2 | 3.1 | 0.39 |
| *E. coli* Juhl | 50 | 100 | >100 (1000) | >100 (>1000) | >100 (>1000) | >100 (>1000) | >100 | >100 (1000) | >100 (1000) |
| *Klebsiella pneumoniae* 10031 | 6.2 | 6.2 | 100 | >100 | >100 | >100 | 12.5 | 100 | 50 |
| *Proteus vulgaris* Abbott JJ | >100 (1000) | >100 (1000) | >100 (>1000) | >100 (>1000) | >100 (>1000) | >100 (>1000) | >100 (>1000) | >100 (>1000) | >100 (>1000) |

TABLE IV – Continued

IN VITRO BIOLOGICAL TEST RESULTS

| Bacteria | Ery. A | Ery. B | Cpd. 12 | Cpd. 18 | Cpd. 14 | Cpd. 17 | Cpd. 20 | Cpd. 13 | Cpd. 15 |
|---|---|---|---|---|---|---|---|---|---|
| *Proteus mirabilis* Finland No. 9 | >100 (1000) | >100 (1000) | >100 (>1000) | >100 (>1000) | >100 (>1000) | >100 (>1000) | >100 (>1000) | >100 (>1000) | (>1000) |
| *Salmonella typhimurium* ED No. 9 | 50 | 50 | 100 | >100 (>1000) | >100 (>1000) | 100 | 25 | 100 | 12.5 |
| *Shigella sonnei* 9290 | 25 | 25 | 50 | >100 | >100 | 100 | 12.5 | 100 | 12.5 |
| *Pseudomonas aeruginosa* BMH No. 10 | 50 | 50 | >100 (1000) | >100 (>1000) | >100 (>1000) | >100 (1000) | 50 | >100 (1000) | >100 (1000) |
| *Strep pyogenes* Roper | >100 | >100 | >100 | >100 | 3.1 | >100 | 100 | >100 | >100 |
| *Strep pyogenes* Scott | >100 | >100 | >100 | >100 | 6.2 | >100 | 100 | >100 | >100 |
| *Haemophilus influenzae* 9334 | 6.2 | 12.5 | 50 | 100 | >100 | >100 | 12.5 | 100 | 25 |
| *Haemophilus influenzae* Brimm CSF Brimm CSF | 3.1 | 3.1 | 12.5 | 100 | >100 | >100 | 6.2 | 50 | 12.5 |
| *Haemophilus influenzae* Illinois | 3.1 | 3.1 | 25 | 100 | >100 | >100 | 6.2 | 25 | 25 |
| *Haemophilus influenzae* Patterson | 3.1 | 6.2 | 25 | 100 | >100 | >100 | 12.5 | 50 | 25 |
| *Haemophilus influenzae* Shemwell | 3.1 | 6.2 | 25 | 100 | >100 | >100 | 6.2 | 25 | 25 |
| *Haemophilus influenzae* Terry | 3.1 | 6.2 | 25 | 100 | >100 | >100 | 6.2 | 25 | 25 |
| Additional Microorganisms | | | | | | | | | |
| *Myco. gallisepti-cum* S6 | 0.05 | 0.05 | 0.02 | 2.5 | 0.5 | 0.25 | 0.005 | 0.05 | 0.02 |
| *Myco. granularum* 19168 | 0.02 | 0.02 | 0.05 | 2.5 | 5.0 | 0.02 | 0.005 | 0.25 | 0.02 |
| *Myco. hyorhinis* 17981 | 50 | 100 | 5.0 | >100 | 100 | >100 | 0.25 | 25 | 1.0 |
| *Myco. pneumoniae* FH | 0.01 | 0.01 | 0.05 | 1.0 | 0.25 | 0.02 | 0.005 | 0.02 | 0.01 |
| *Trichomonas vaginalis* CIMI | >100 | >100 | >100 | >100 | 25 | >100 | >100 | >100 | >100 |
| *Crithidia fascicu-lata* | >100 | >100 | >100 | >100 | >100 | >100 | >100 | >100 | >100 |

The erythromycin derivatives here were also tested in vivo. They were orally administered to mice to treat an induced *Staphylococcus aureus* infection. Results are as follows:

TABLE V

| Compound No. | Approximate $CD_{50}$ (Mg./Kg.) |
|---|---|
| 1 | 100–200 |
| 3 | 50–100 |
| 5 | 100 |
| 7 | 200–400 |
| 9 | 200–400 |
| 11 | 100–200 |
| 2 | 150–300 |
| 4 | 300 |
| 12 | 150–300 |
| 18 | >300 |
| 14 | 150–300 |
| 17 | >300 |
| 20 | — |
| 13 | >300 |
| 15 | >300 |
| 21 | 150 |
| 22 | 200 |

As noted above prior art esters of erythromycin oximes are subject to unwanted hydrolysis. Such esters are quite reactive toward nucleophiles such as water, alcohols and primary and secondary amines including the $NH_2$-terminal group of amino acid esters and peptides. In many cases, such hydrolysis reaction is facile and occurs readily at room temperature.

With regard to the compounds of the invention, it has been noted that the rate of hydrolysis of these esters is materially decreased. This is no doubt due to the increase of steric bulk about the ester carbonyl.

In order to demonstrate the difference in solvolysis of prior art esters and the esters here, typical esters were chosen as well as a known ester of erythromycin oxime and subjected to solvolysis by methanol. The solvolysis reaction rates were followed by thin-layer chromatography, and the times required to half-solvolyse the esters were noted. Results are as follows:

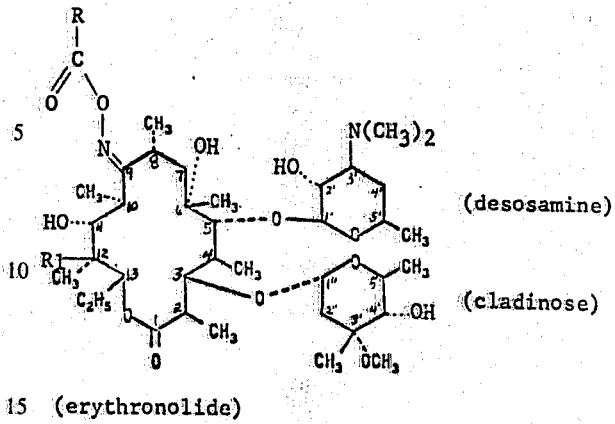

where $R_1$ is hydrogen or hydroxy, and R is a bulky alkyl group of 1–4 carbons, or a substituted aryl group, said substituted aryl group having the structural formula

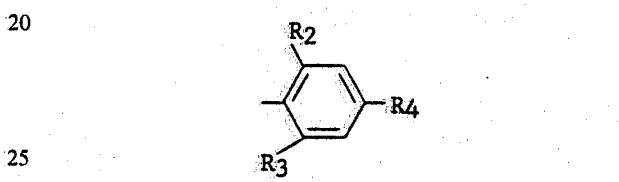

where $R_2$ and $R_3$ are loweralkyl of 1–4 carbons and $R_4$ is selected from the group consisting of carboxamide, a $C_1$–$C_4$ alkyl, carboxyalkyl, carboxylic acid, aminoalkyl, substituted aminoalkyl, carboxyaminoalkyl, and salts of lower carboxylic acids.

2. The compound of claim 1 which is 9-(O)-(2,6-dimethyl-4-carbomethoxy)benzoylerythromycin B oxime.

3. The compound of claim 1 which is 9-(O)-(2,6-dimethyl-4-benzyloxycarbonyl)benzoylerythromycin B oxime.

4. The compound of claim 1 which is 9-(O)-[2,6-dimethyl-4-(N-n-butylcarbomyl)]benzoylerythromycin B oxime.

TABLE VI
Comparison of Methanolysis Rates of
Various Erythromycin Oxime Esters

| Compound | | Half-Life at 25° C. |
|---|---|---|
| B=N-O-C(O)-C₆H₅ | (Prior Art) | 1 day |
| B=N-O-C(O)-C(CH₃)₃ | (Example I) | 10 days |
| B=N-O-C(O)-(2,6-dimethylphenyl) | (Example II) | No reaction after 40 days |

I claim:

1. The compound 9-(O)-(2,6-dimethyl-4-carbomethoxy)benzoylerythromycin A oxime having the following general structural formula 5. The compound of claim 1 which is 9-(O)-[2,6-dimethyl-4-(N-morpholinylcarbonyl)]benzoylerythromycin B oxime.

6. The compound of claim 1 which is 9-(O)-(2,6- dimethyl-4-(N-methylpiperazinylcarbonyl)benzoylerythromycin B oxime.

7. The compound of claim 1 which is 9-(0)-{2,6-dimethyl-4-[N-(2-hydroxypropyl)-N-piperazinyl carbonyl]}benzoylerythromycin B oxime.

8. The compound of claim 1 which is 9-(0)-[2,6-dimethyl-4-(4-methyl-1-pentyloxycarbonyl)]benzoylerythromycin B oxime.

9. The compound of claim 1 which is 9-(0)-{2,6-dimethyl-4-[3-(N,N-dimethylamino)propyloxy carbonyl]}benzoylerythromycin B oxime.

10. The compound of claim 1 which is 9-(0)-{2,6-dimethyl-4-[N-(4-methyl-1-pentyl)carbamyl]}benzoylerythromycin B oxime.

11. The compound of claim 1 which is 9-(0)-{2,6-dimethyl-4-[3-(N,N-dimethylamino)propyl carbamyl]}benzoylerythromycin B oxime.

12. The compound of claim 1 which is 9-(0)-(2,6-dimethyl-4-carboxy)benzoylerythromycin B oxime.

13. The compound of claim 1 which is 9-(0)-[2,6-dimethyl-4-(N,N-dimethylaminomethyl)]benzoylerythromycin B oxime.

14. The compound of claim 1 which is 9-(0)-{2,6-dimethyl-4-[n-butyloxycarbonyl]}benzoylerythromycin B oxime.

* * * * *